Nov. 23, 1965 H. H. ABBOTT 3,219,762

DIAL PULSE DETECTOR

Filed July 12, 1962 3 Sheets-Sheet 1

INVENTOR
H. H. ABBOTT
BY S E Hollander
ATTORNEY

| BINARY COUNTERS PULSE CODES | A | B | C | D |
|---|---|---|---|---|
| RESET | 0 | 0 | 0 | 0 |
| 1 | 1 | 1 | 1 | 1 |
| 2 | 0 | 1 | 1 | 1 |
| 3 | 1 | 0 | 1 | 1 |
| 4 | 0 | 0 | 1 | 1 |
| 5 | 1 | 1 | 0 | 1 |
| 6 | 0 | 1 | 0 | 1 |
| 7 | 1 | 0 | 0 | 1 |
| 8 | 0 | 0 | 0 | 1 |
| 9 | 1 | 1 | 1 | 0 |
| 10 | 0 | 1 | 1 | 0 |

INVENTOR
H. H. ABBOTT
BY
S E Hollander
ATTORNEY

INVENTOR
H. H. ABBOTT
BY
SE Hollander
ATTORNEY

United States Patent Office 3,219,762
Patented Nov. 23, 1965

3,219,762
DIAL PULSE DETECTOR

Henry H. Abbott, Chatham, N.J., assignor to Bell Telephone Laboratories, Incorporated, New York, N.Y., a corporation of New York Filed July 12, 1962, Ser. No. 209,335
10 Claims. (Cl. 179—84)

Figure 1:
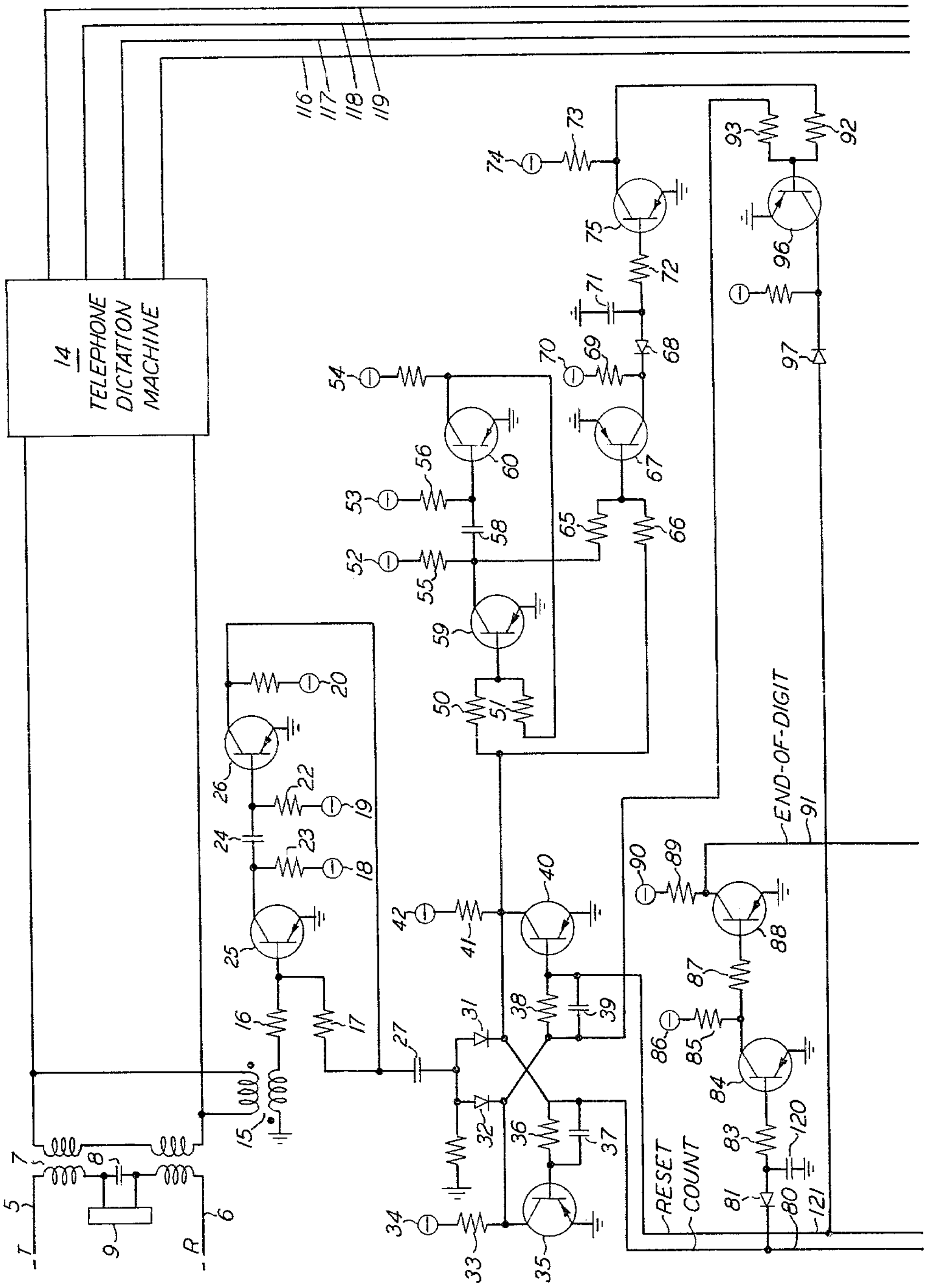

This invention relates to pulse detectors and more particularly to circuits for detecting dial pulses transmitted over telephone exchange networks.

In the majority of telephone systems employed at the present time, signaling information is transmitted by the operation of a rotary dial by the subscriber. A D.C. signaling path exists between the dial of the station and the central office, and changes in the D.C. condition of the line by the operation of the dial controls the switching equipment at the central office. However, it is also often necessary to transmit dial pulses over a signaling path which does not directly connect the dial to the switching equipment in which case a D.C. signaling path does not exist. For example, numerous telephone dictation machines are presently employed which permit a calling party to dictate over the telephone exchange network. This telephone exchange network, connecting the telephone station to the dictation machine, does not provide a D.C. signaling path between the dial of the station and the trunk at the machine because of the transformer connections between the junctors and trunk circuits in the exchange network. Although this D.C. path does not exist it is nevertheless sometimes necessary to control the operation of the dictation machine by means of dial pulses transmitted over the telephone exchange network. The dictating telephone user may for example be required to dial a "7" when he desires to make a correction, an "8" at the end of his message, a "9" for play-back, a "10" to call in an attendant, or other numbers for other services.

Numerous other types of equipment connected to a calling substation over the message telephone exchange network may require dial pulse clicks for their operations and for this reason it is necessary that adequate detectors be available for detecting dial pulse information transmitted over an A.C. channel.

When a dial is operated after a regular telephone connection has been completed, transient pulses in the voice transmission band occur rather than the clearly defined break and make steps that result when the signaling is over a D.C. path. The amplitude and frequency characteristics of the transient pulses produced by rotating the dial in these circumstances are of various types. Over short connections the clicks may be large in magnitude and comprise relatively few oscillations for each dial pulse. Over other types of connections there may be a sequence of random type pulses for each dial pulse. Over the longer connections, the voltage pulses may have an order of magnitude comparable only with that of the voltage produced by speech, each click comprising a relatively long oscillatory waveform, however. A generally applicable dial pulse detector must therefore not only respond to many different types of transient waveforms but in addition must also include means to avoid false pulse signals during normal speech transmission, as the magnitude of the speech signals may be as great as that of the signaling information.

It is an object of this invention to provide an improved pulse detector.

It is another object of this invention to provide a dial pulse detector for detecting and analyzing dial pulses transmitted over a telephone exchange network regardless of the various lengths of line over which they are received.

It is another object of this invention to provide an A.C. dial pulse detector capable of distinguishing between valid dial pulse signals and voice signals similar but not identical to them.

As will be explained below, there is one particular type of "noise" signal which is often received over the A.C. network when a rotary dial is operated. This noise, which results from the operation of the rotary dial itself, can often erroneously operate the control circuit of the dictating or other machine attached to the called party's line. It is still another object of this invention to prevent these noise signals from erroneously operating the control circuit.

Briefly, in the illustrative embodiment of the invention, the higher valued digits on the rotary dial, namely digits 7–10, are used to operate the control circuit. The detector checks that the signals received (which may include noise signals) do not occur at too rapid a rate. This will be the case if noise or speech signals erroneously operate the detector circuit. Noise or speech signals, in operating the detector circuit at too fast a rate, notify it that the signals received are not true dial pulses. Similarly, the circuit is provided with means to check that the dial pulses do not occur at too slow a rate. Only if the dial pulse clicks occur at a rate within minimum and maximum bounds does the detector circuit operate the control mechanism of the dictation or other machine connected to the called party's line. The higher numbered digits on the dial are used for control purposes in order that there be sufficient pulses detected to check that they are indeed occurring at a correct rate.

All of the different types of dial pulse oscillatory waveforms received are made compatible with a single detector circuit by providing means for detecting the initial portion of each waveform and for inhibiting the detector circuit for the duration of the oscillatory signal. In this manner although the transient received may comprise many positive and negative peaks, the particular number depending on the length of line and other characteristics of the transmission path, only the initial positive peak of the waveform has an effect on the detector circuit, the remaining peaks being inhibited from operating the circuit. By permitting only the initial positive peak of the received transient waveform to operate the detector circuit, the detector circuit is compatible with all lengths of line independent of the total number of oscillations received as a result of the particular line length. In addition, as to be described below, this inhibiting operation has a duration longer than the duration of any of the transients received over any of the various transmission paths connected to the detector. This prevents the erroneous operation of the control circuit by the frequently occurring noise signal produced by the operation of the rotary dial itself referred to above.

It is a feature of this invention to operate the control circuit of a telephone dictation machine or similar device by the higher valued digits on a subscriber's rotary dial or similar pulsing device.

It is another feature of this invention to provide means for determining that incoming break and make transients do not occur at too rapid a rate.

It is another feature of this invention to check the rapidity of the rate of the dial pulses not merely by considering the time interval between two successive pulses or the time interval between successive break or make transients, but by considering the time interval during which three successive transients, e.g., break-make-break, occur.

It is another feature of this invention to provide means for determining that incoming break and make transients do not occur at too slow a rate.

It is another feature of this invention to enable the same circuitry to detect too slow a pulse rate as well as to determine the end of the dialed digit.

It is another feature of this invention to prevent the latter portions of all incoming break and make transients from operating upon the detector circuit.

It is still another feature of this invention to inhibit the detector operation after the initial appearance of a transient for a period greater than the duration of the transient.

Figures 2, 4:
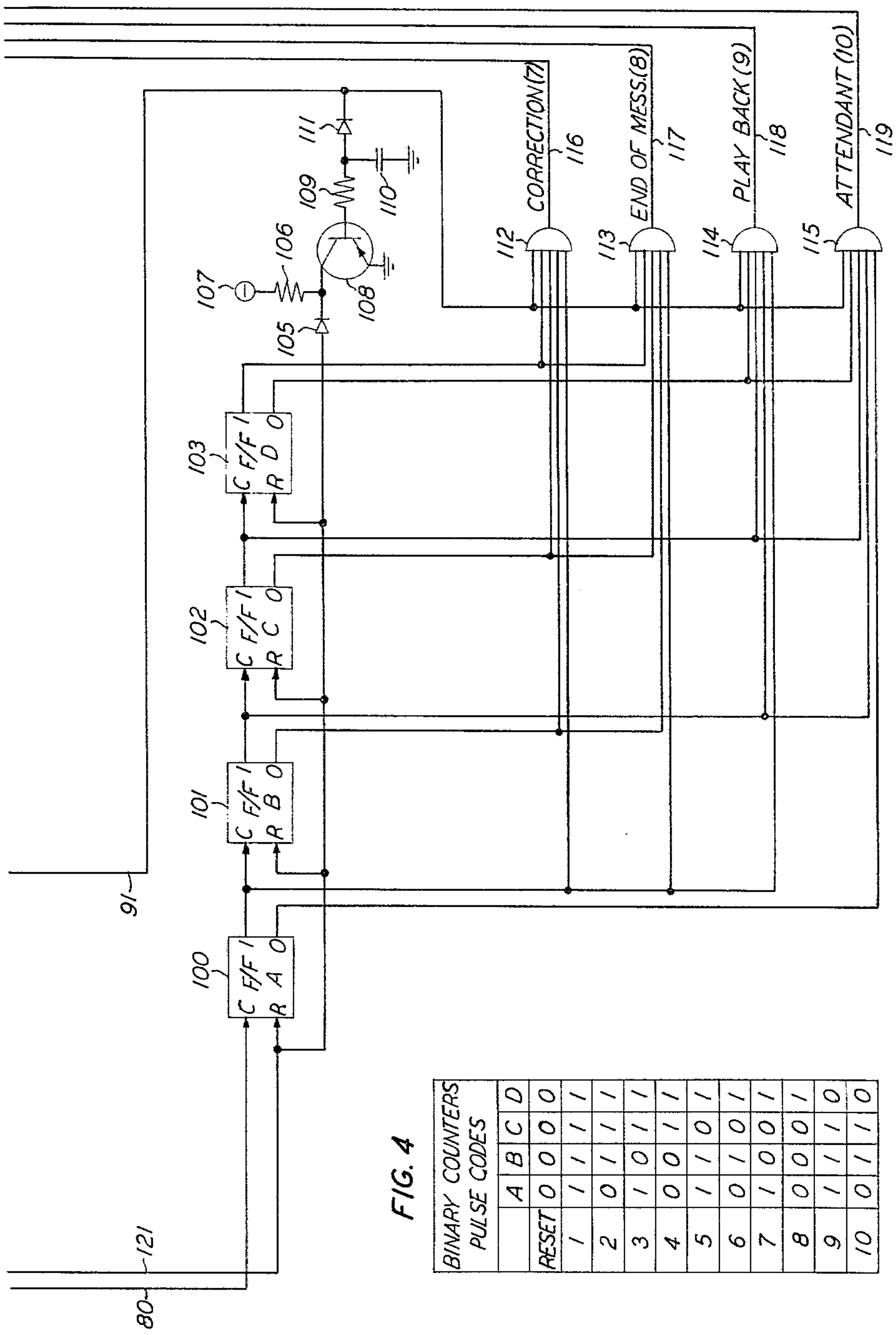
Figure 3:
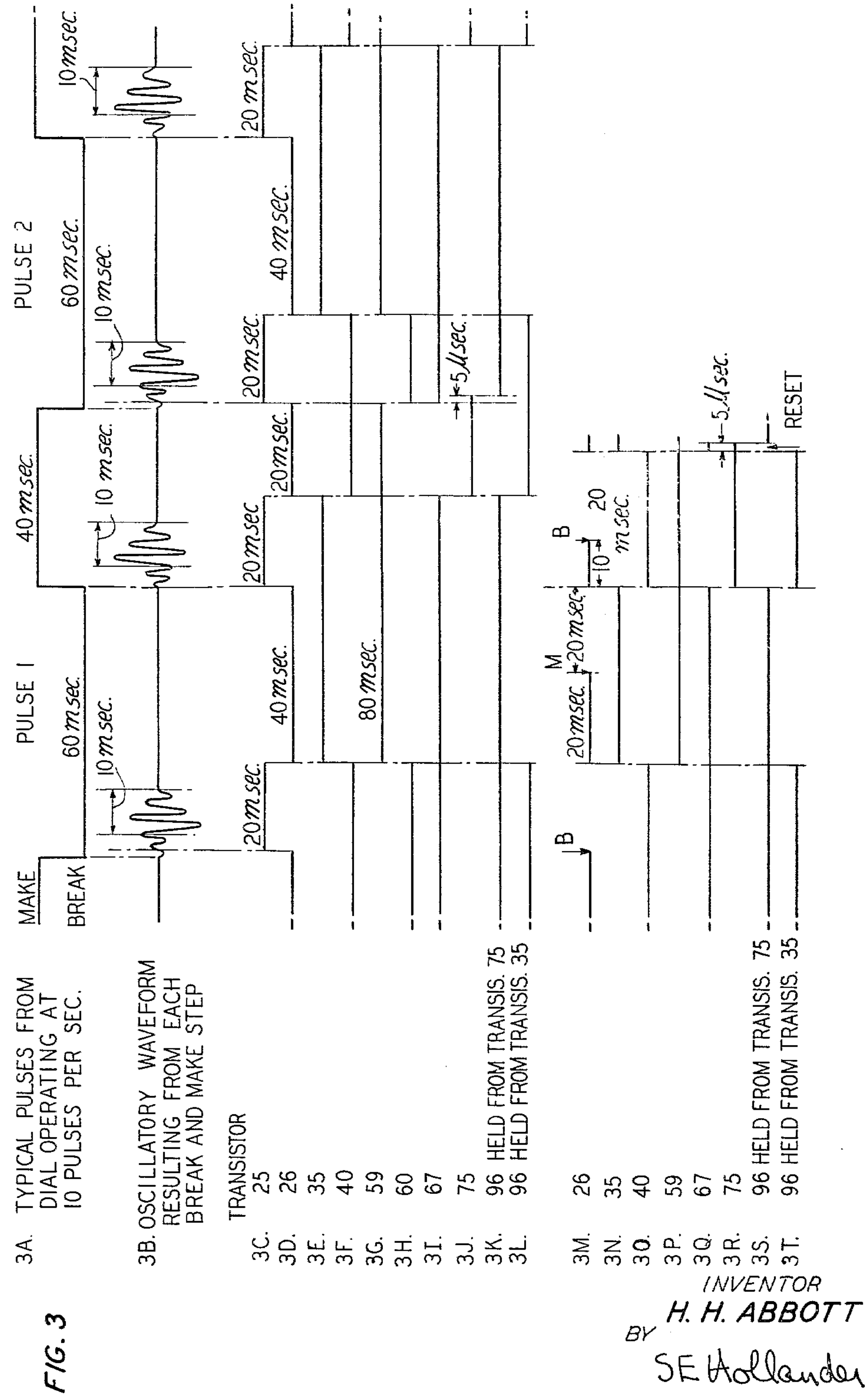

Further objects, features and advantages of the invention will become apparent upon consideration of the following detailed description in conjunction with the drawing wherein:

FIGS. 1 and 2 disclose an illustrative embodiment of the invention;

FIG. 3 is a sequence chart showing the conducting states of various transistors in the illustrative embodiment when pulses are received at a correct rate and when they are received at too rapid a rate; and FIG. 4 shows the states of the four flip-flops 100–103 on FIG. 2 for the various dialed digits.

Referring to FIG. 3A, typical pulses from a dial operating at ten pulses per second are shown. Each pulse comprises a break portion of 60 milliseconds. The succeeding pulse occurs 40 milliseconds after the termination of this break. In FIG. 3B are shown the break and make transients as they are transmitted through the telephone exchange network and received by the detector of FIGS. 1 and 2. Each break or make step results in an oscillatory waveform having both positive and negative peaks. The maximum duration of each break and make oscillation is 10 milliseconds. Each transient is received at the detector approximately at the same time that the original step is produced. However, as shown in FIG. 3B, a short oscillatory waveform precedes the major portion of each break and make transient. The reason for this as well as its effect on the detector circuit will be described below. For the moment, however, it will be assumed that each received break and make transient as seen by the detector, begins with the oscillatory signal occurring prior to the 10 milliseconds of the main transient. For the purposes of the following analysis it is immaterial whether or not each break and make transient is considered to occur slightly before the beginning of the respective 10 milliseconds of major transient as all break and make transients still have the same time relationship to each other.

GENERAL DESCRIPTION

For typical dial pulses the first make transient occurs 60 milliseconds after the first break transient. The second break transient occurs 40 milliseconds later. If pulses are received at too rapid a rate the first make transient may occur less than 60 milliseconds after the first break and the second break may occur less than 40 milliseconds after the first make. The detector of FIGS. 1 and 2 checks that pulses are not received at too rapid a rate by checking that the first make and the second break do not both occur within 80 milliseconds after the first break. This check feature thus does not merely check the duration of the first pulse nor does it only check the time interval between pulses. Rather, the termination of a pulse and the beginning of the succeeding pulse must both occur within a specified time interval to indicate too rapid a rate.

The transient resulting from each break and make step causes the 20 millisecond monostable multivibrator comprising transistors 25 and 26 to be triggered. Each operation of this multivibrator in turn switches the state of the flip-flop comprising transistors 35 and 40. Thus the flip-flop is switched twice for each dial pulse, once for the break and a second time for the make.

When the flip-flop is originally switched by the first break in the pulse train it causes three operations. First, it advances the count of counters 100–103 which count the number of dial pulses received. Second, it causes transistor 84 to turn on and transistor 88 to turn off. A negative potential thus appears on the end-of-digit lead 91 which causes the reset transistor 108 to turn on. This has no effect on the circuit at this time, however. Third, the first switching of the flip-flop triggers the 80 millisecond monostable multivibrator comprising transistors 59 and 60.

The flip-flop, if valid dial pulses are being received, is switched back to its initial reset state 60 milliseconds after its first triggering as a result of the first transient. Transistor 67 is an OR gate which conducts when either the 80 millisecond monostable multivibrator is in its stable state or the flip-flop is in its set state. After the first make transient is received neither of these conditions is obtained as the monostable multivibrator is in its unstable state and will remain in this state for another 20 milliseconds, and the flip-flop is reset. Transistor 67 turns off and causes transistor 75 to turn on.

If pulses are not being received at too rapid a rate, the maximum rate being three successive break-make-break transients within 80 milliseconds, the second break should not be received during the 80 milliseconds of the unstable state operation of the monostable multivibrator. Transistor 75 turns on and remains on after the flip-flop is reset by the first make which turns transistor 67 off. During the next 20 millisecond interval the second break should not occur if valid dial pulses are being received. With transistor 75 conducting for this 20 millisecond interval, one input of OR gate 96 is disenabled. The other input is disenabled whenever the flip-flop is in its set state after the application of a break. If the break is not received during the 20 milliseconds that transistor 67 is off transistor 96 remains conducting because although the input to this OR gate from transistor 75 is not enabled, the flip-flop in its reset state enables the other input and the circuit is not reset. And when the second break is finally received, although the flip-flop is now set and disenables one input to the OR gate, the 80 millisecond timing period has terminated, transistor 75 is off, and the other input of OR gate 96 is enabled.

However, if the second break does occur during the 20 millisecond interval that transistor 75 conducts, the flip-flop is set, both inputs of OR gate 96 are disenabled, and this circuit turns off causing the entire circuit to reset. The count stored in counters 100–103 is erased as valid dial pulses have not been received. Only if the pulses are not received at too rapid a rate does transistor 96 remain conducting and not cause the circuit to reset.

The first break, in switching the flip-flop, causes a negative potential to be applied to the end-of-digit conductor 91 which turns on transistor 108. This has no effect on the circuit, however, as diode 105 is reverse biased. When the flip-flop is in its set state transistor 88 remains off. When the first make switches the flip-flop to its reset state transistor 84 is held on by the discharge of capacitor 120 for 60 milliseconds which in turn holds transistor 88 off. As break transients normally occur 40 milliseconds after make transients transistor 84 does not turn off nor does transistor 88 turn on as long as dial pulses are being received. The flip-flop forward biases transistor 84 before capacitor 120 has completed its discharge. In this manner the end-of-digit conductor 91 remains negative in potential as long as dial pulses are received. However, if a break does not follow a make within 60 milliseconds, transistor 88 turns on, and one of two conditions is indicated. Either a complete digit has been received and no more break transients occur, or erroneous signals, occurring at a slow rate, are being received. In either event the end-of-digit conductor 91 increases in potential. This potential causes one input of AND gates 112–115 to be energized and if one of the digits 7–10 is stored in counters 100–103 a read-out pulse appears on one of conductors 116–119. On the other hand, if one of the digits 7–10 is not stored in the counters no read-out pulse is obtained. In either event the increased potential on conductor 91 causes transistor 108 to turn off which causes the entire circuit to reset. The same circuitry is used to detect both too slow a pulse rate and an end-of-digit condition. If 7, 8, 9 or 10 pulses have been counted the increased potential on conductor 91 is most likely a result of an end-of-digit condition and read-out is effected. If one of these digits has not been counted when conductor 91 increases in potential this condition is most likely a result of an erroneous signal with a pulse rate less than that of a valid digit. The higher numbered digits 7–10 are used for control purposes in order that the same circuitry perform the two functions, one function being the avoidance of false signals, the other function being the indication of a correct signal.

In this manner the circuit not only detects too rapid a pulse rate but too slow a pulse rate as well. Too rapid a pulse rate is obtained when three successive break, make and break transients occur within 80 milliseconds. Too slow a pulse rate occurs if a break follows a make by more than 60 milliseconds unless one of the digits 7–10 has been counted. In the latter event read-out is effected and dictation machine 14 is controlled in accordance with the digit received, counted, and stored in stages 100–103.

DESCRIPTION OF COMPONENT CIRCUITS

(1) *Input circuit*

Referring to FIGS. 1 and 2, tip and ring conductors 5 and 6 are connected to the telephone exchange network, not shown in the drawing, and it is over these conductors that the voice message as well as the dial pulse transients are transmitted. Transformer 7 connects the called party's line to telephone dictation machine 14. A relay 9 is provided for other control and supervisory purposes. This relay may be controlled by the direct current in the tip and ring conductors. As with ordinary telephone circuits, a direct current flows through the tip and ring conductors of the called party's line. However, this direct current does not flow through the entire telephone exchange network and for this reason the operation of the rotary dial by the calling party results in the oscillatory waveforms of FIG. 3B being superimposed on the direct current in conductors 5 and 6. Capacitor 8 provides a low impedance path for the voice signals and the oscillatory clicks across the coil of relay 9.

Voice messages and control pulses are transmitted through the secondary of transformer 7 to telephone dictation machine 14. They are also transmitted through transformer 15, the primary of this transformer being connected in parallel with the secondary of transformer 7, to the detector circuit. Conductors 116–119 are connected to the control inputs of the ditctation machine and are energized in response to respective digits 7–10 being dialed. It is the function of the detector circuit to count the dial pulses and to distinguish them from voice signals and noise in order that the voice message itself or extraneous noise not erroneously operate the controls of the dictation machine.

(2) *Twenty millisecond monostable multivibrator—transistors 25 and 26*

Transistor 25 is normally off, the base of this transistor being connected through resistor 16 and the secondary of transformer 15 to ground thus maintaining a zero bias across the emitter-base junction. Transistor 26 is normally conducting as its emitter-base junction is forward biased due to the connection of the base through resistor 22 to negative source 19. Transformer 15 inverts the incoming transients. All incoming negative spikes therefore result in positive spikes on the base of transistor 25 which have no effect on the transistor. However, all incoming positive spikes result in negative spikes being applied to the base of transistor 25 and the transistor momentarily conducts. The transistor thus conducts when both break and make transients are received as each transient has at least one positive spike. When transistor 25 conducts its collector increases in potential from that of negative source 18. This increased potential is transmitted through capacitor 24 to the base of transistor 26 which thus turns off. Capacitor 24 charges and maintains transistor 26 off until the capacitor discharges through resistor 22 into source 19. When transistor 26 turns off its collector assumes the negative potential of source 20, this potential being transmitted through resistor 17 to further maintain transistor 25 on. Transistors 25 and 26 thus comprise a monostable multivibrator, the duration of whose operation is determined by the time required for capacitor 24 to discharge. This time is 20 milliseconds. During this 20 millisecond interval, additional positive spikes of the oscillatory clicks have no effect as transistor 25 is already on and remains on until capacitor 24 discharges. The effect of this monostable multivibrator is to inhibit all peaks other than the first positive one of each break or make transient from having an effect on the detector circuit. Each break and make transient has decayed by the time the monostable multivibrator reverts to its stable state, the maximum total transient duration only slightly exceeding 10 milliseconds, and the multivibrator circuit is thus operated only once for each break or make transient.

(3) *Bistable multivibrator—Transistors 35 and 40*

When transistor 26 first turns off the junction of resistor 17 and capacitor 27 is made negative in potential. This negative step has no effect on the flip-flop comprising transistors 35 and 40 as the negative step is blocked by diodes 31 and 32. After the 20 millisecond unstable operation, however, the collector of transistor 26 becomes more positive in potential and this positive step is transmitted through capacitor 27 and diodes 31 and 32. Thus the bistable circuit comprising transistors 35 and 40 switches states only after each 20 millisecond interval.

The bistable circuit is initially reset with transistor 40 conducting and transistor 35 nonconducting. The negative potential on the collector of transistor 35 is transmitted through resistor 38 to the base of transistor 40 to maintain it conducting while the more positive potential on the collector of transistor 40 is extended through resistor 36 to the base of transistor 35 which is thus held off. Positive pulses are transmitted through capacitor 27 for each break and make transient. The first positive pulse, occurring 20 milliseconds after the initial appearance of the first break transient, is transmitted through diode 32 to the base of transistor 40 which is thus turned off. The negative potential of source 42 is now extended through resistors 41 and 36 to the base of transistor 35 which now turns on. The potential at the collector of this transistor increases and holds transistor 40 off. The positive pulse transmitted through capacitor 27, 60 milliseconds later, as a result of the first make transient, is transmitted through diode 31 and in a similar manner switches the flip-flop to its initial reset state. Thus each complete dial pulse causes the flip-flop to switch back and forth.

FIGS. 3C through 3L show the conducting states of various transistors in the detector circuit during each cycle of normal operation. A solid line indicates that the respective transistor is conducting while the blank portions indicate that it is not. Referring to FIG. 3C it is seen that transistor 25 conducts for 20 milliseconds when the first positive signal is transmitted through tip and ring conductors 5 and 6. At this time transistor 26 turns off. After 20 milliseconds transistor 26 turns on once again and transistor 25 turns off. When the first positive spike of the first make transient appears, transistor 25 conducts once again and transistor 26 turns off for 20 milliseconds. Succeeding break and make transients have the same effect on the circuit.

After the first 20 millisecond interval, transistor 35 is turned on and transistor 40, which was priorly conducting in the reset state, turns off. Transistors 35 and 40 continue to switch states after each 20 millisecond period of the monostable multivibrator operation.

Each turning off of transistor 40 with the application of a break transient results in a negative potential being transmitted not only to the base of transistor 35 to turn the latter on, but in addition along conductor 80 to the count input of flip-flop 100. Flip-flop 100 is the first stage in the four-stage binary counter comprising flip-flops 100–103. Positive pulses on conductor 80 have no effect on flip-flop 100.

*(4) Eighty millisecond monostable multivibrator—Transistors 59 and 60*

Transistors 59 and 60 together form a monostable multivibrator whose operation is similar to that of the multivibrator comprising transistors 25 and 26. Transistor 59 is normally off as is transistor 25. In the reset condition with transistor 40 on, ground potential is extended through transistor 40 and resistor 50 to the base of transistor 59 which is thus held off. Negative source 53 forward biases the emitter-base junction of transistor 60 which normally conducts. When transistor 40 first switches states, following the application of the first break transient, its collector becomes negative in potential. This potenital is extended through resistor 50 to forward bias the emiter-base junction of transistor 59 which thus turns on. A positive pulse is transmitted through capacitor 58 to turn transistor 60 off, the negative potential at the collector of this transistor now being extended through resistor 51 to further hold transistor 59 conducting. The unstable state operation persists until capacitor 58 discharges through resistor 56 into source 53 at which time the multivibrator reverts to its stable state. The duration of this discharge and thus the duration of the monostable operation is 80 milliseconds. Thus the first transient received, that is, the break of the first pulse, after 20 milliseconds, causes the bistable circuit comprising transistors 35 and 40 to switch states, counter 100 to be advanced by one count, and the monostable multivibrator comprising transistors 59 and 60 to assume its unstable state for 80 milliseconds.

Referring to FIG. 3G it is seen that transistor 59 is turned on with the turning off of transistor 40. Transistor 59 remains on for 80 milliseconds independent of the fact that transistor 40 turns on once again with the application of the first make transient after 60 milliseconds have elapsed. This is due to the fact that transistor 59 is held on from negative source 54 independent of changes in potential at the collector of transistor 40. This is analogous to the 20 millisecond monostable operation of transistors 25 and 26 independent of additional input spikes. After 80 milliseconds transistor 59 turns off and remains off until transistor 40 turns off once again and transmits a negative pulse through resistor 50 to the base of transistor 59 to turn the later on. It is thus seen that transistor 59 conducts for 80 milliseconds after each break transient causes the bistable circuit comprising transistors 35 and 40 to change states. It is within this 80 millisecond interval that only one more transient, a make, should be detected if the pulses are not occurring at too rapid a rate. If pulses are received at too rapid a rate, indicating for example that they are a result of speech signals rather than dial pulses, at least two pulses will be received in the 80 millisecond interval and the detector circuit will thus be made aware that the signals received are not a result of valid dial pulses.

FIG. 3H illustrates the operation of transistor 60 which is the converse of the operation of transistor 59, the two of them together forming a multivibrator circuit.

*(5) OR gate—Transistor 67*

Transistor 67 is normally conducting. This transistor conducts if either of resistors 65 or 66 is connected to a negative potential, the emitter-base junction of transistor 67 thus being forward biased. In the reset state resistor 66 is connected to the collector of transistor 40 which is approximately at ground potential as transistor 40 is on. However, resistor 65 is connected to the collector of nonconducting transistor 59 which is maintained at the potential of negative source 52. Thus in the reset condition transistor 67 conducts. With the application of the first break transient, transistor 40 turns off and transistor 59 turns on. Although resistor 65 is no longer connected to a negative potential, resistor 66 is now connected through resistor 41 to negative source 42 and transistor 67 remains conducting.

Referring to FIG. 3I it is seen that transistor 67 conducts in the reset condition before the application of the first break transient and continues to conduct until after the bistable circuit comprising transistors 35 and 40 switches states a second time in response to the first make transient. At this time, the unstable state operation of transistors 59 and 60 is not affected as this operation continues for 80 milliseconds independent of the fact that transistors 35 and 40 change states after only 60 milliseconds in response to the first make. Thus transistor 67 is still not maintained conducting through resistor 65. For the 60 milliseconds after the first operation of the bistable circuit, transistor 67 is held on because resistor 66 is connected through resistor 41 to negative source 42. When the first make transient switches transistor 40 to its normal conducting state however, the collector potential becomes more positive. At this time neither of resistors 65 nor 66 are connected to sufficient negative potentials to maintain transistor 67 conducting and the latter turns off. In FIG. 3I it is seen that after the second operation of the monostable multivibrator circuit comprising transistors 25 and 26, transistor 59 is still on and transistor 40 is now similarly on. At this time, transistor 67 turns off. It turns on only after the 80 milliseconds of unstable state operation of transistors 59 and 60 have elapsed at which time resistor 65 is connected through resistor 55 to negative source 52. Transistor 67 conducts at this time as it did prior to the application of the break transient of the first pulse, transistor 67 as well as the monostable multivibrator circuit comprising transistors 59 and 60 and the bistable circuit comprising transistors 35 and 40 being prepared for the next incoming break transient of the second pulse.

Transistor 67 is thus turned off only after a make as well as a break transient is received. The make transient which causes transistor 67 to turn off is the only transient that should be received during the 80 milliseconds after the first turning off of transistor 40 if pulses are not being received at too rapid a rate. If transistor 40 is not turned off to indicate the appearance of the break transient of the second pulse within the next 20 milliseconds during which transistor 67 is off, the first two pulses received are assumed to have comprised the break and make transients of a valid dial pulse.

*(6) Five microsecond delay—Transistor 75*

Transistor 75 is normally nonconducting. Were this transistor to conduct, capacitor 71 would charge and a positive potential would appear at the junction of diode 68 and the capacitor. This would reverse bias the emitter-base junction of transistor 75. As a consequence, transistor 75 is normally nonconducting. When transistor 67 turns off, however, the negative potential of source 70 causes its collector to become negative in potential. This negative potential is transmitted directly through diode 68 and resistor 72 to the base of transistor 75, the emitter-base junction of this transistor thus becoming forward biased. Transistor 75 remains on, current flowing from ground through the emitter-base junction of transistor 75, resistor 72, diode 68, and resistor 69 to negative source 70. Referring to FIG. 3J it is seen that transistor 75 conducts when transistor 67 turns off.

Although transistor 67 turns on once again when transistor 59 turns off after 80 milliseconds of conduction, transistor 75 continues to conduct for 5 microseconds. By the time transistor 67 turns off transistor 75 has already conducted for 20 milliseconds and the junction of diode 68 and capacitor 71 is negative in potential, capacitor 71 having charged from negative source 70 during the operation of transistor 75. Although diode 68 becomes reverse biased when transistor 67 turns on, the negative potential of source 70 at its cathode being less than the negative potential across capacitor 71, the capacitor charge maintains transistor 75 conducting until the capacitor discharges through the emitter-base junction. Current flows from ground through the emitter-base junction, resistor 72 and capacitor 71. After capacitor 71 has discharged, transistor 75 is held off as it was in the reset condition. This discharge requires 5 microseconds and thus transistor 75 remains on for 5 microseconds after transistor 67 turns on. After 5 microseconds transistor 75 turns off once again, and, as the other transistors in the circuit, is thus prepared for another cycle of operation which ensues approximately 20 milliseconds thereafter.

*(7) OR gate—Transistor 96*

Normally conducting transistor 96 controls the resetting of the entire circuit if pulses are received at too rapid a rate. In normal operation only one transient, the make of the first pulse, occurs within 80 milliseconds after the first break. If the next break does not occur within the same 80 millisecond period transistor 96 remains conducting and the circuit is not reset. Transistor 96 conducts when either of resistors 92 or 93 is connected to a negative potential. As seen in FIGS. 3K and 3L transistor 96 is held on from either transistor 75 or transistor 35. When transistor 75 is off, its collector, connected through resistor 73 to source 74, is negative in potential and holds transistor 96 on. In FIG. 3K transistor 96 is shown conducting whenever transistor 75 is off. Similarly, transistor 96 is held conducting whenever transistor 35 is off, resistor 93 being connected at this time through resistor 33 to negative source 34. As shown in FIG. 3L, transistor 96 is held on whenever transistor 35 is nonconducting, that is, whenever the flip-flop is in its reset state. It is seen that if valid dial transients are being received, transistor 96 is continuously held on from either transistor 75, or transistor 35, or both, and transistor 96 does not turn off to reset the circuit. The binary counter comprising stages 100–103 continues to advance each time a break transient causes transistor 40 to turn off.

FIGS. 3M–3T illustrate the manner in which transistor 96 turns off to control the resetting of the entire circuit if pulses are received at too rapid a rate as a result of speech signals or other sources. FIG. 3M illustrates the case in which the first make follows the first break after 40 rather than 60 milliseconds and the second break follows the first make after 30 milliseconds rather than 40. Since the first make and second break both occur within 80 milliseconds after the first break transistor 96 should turn off and cause the circuit to reset.

Referring to FIG. 3N it is seen that transistor 35 turns on 20 milliseconds after the first break and turns off 20 milliseconds after the first make as in normal operation. Transistor 40, as seen in FIG. 3O, also operates in the normal manner. Referring to FIG. 3P it is seen that transistor 59, as in normal operation, turns on when transistor 40 first turns off. It remains on for 80 milliseconds and thus as seen in FIG. 3P conducts not only while the flip-flop comprising transistors 35 and 40 switches states due to the application of the first make but in addition even while this flip-flop changes states due to the application of the second break.

Transistor 67 remains on as usual while either transistor 59 is off or transistor 40 is off. When both of transistors 59 and 40 are on, however, transistor 67 turns off as in normal operation. In FIG. 3Q transistor 67 is shown on until transistor 40 has turned on due to the first make. At this time transistor 67 turns off and remains off until the second break turns transistor 40 off once again.

Transistor 75, as in normal operation, turns on when transistor 67 turns off and remains on for an extra 5 microseconds even after transistor 67 turns on once again as seen in FIG. 3R. Referring to FIGS. 3S and 3T it is now seen that a 5 microsecond interval exists during which transistor 96 is not held on from either of transistors 75 or 35. Transistor 96 is held on from transistor 35 when the latter is off as seen in FIG. 3T. It is held from transistor 75 when this transistor is off as seen in FIG. 3S. Because transistor 75 is held on for an additional 5 microseconds after transistor 67 has turned on, during this period transistor 96 is not held from transistor 75. As transistor 35 is at this time on, transistor 96 is not held from either of transistors 75 or 35 and transistor 96 turns off. The collector of transistor 96 becomes negative in potential and a negative pulse is transmitted through diode 97 to conductor 121. This pulse causes the entire circuit to reset. The negative pulse is extended directly to the base of transistor 40 which turns on and is thus in the reset state. The negative pulse is also transmitted along conductor 121 to the reset input of each of the four binary counter stages which thus reset and erase the count stored therein.

This resetting operation does not occur if the second break transient occurs more than 80 milliseconds after the first break as in proper operation. If pulses are being received at a proper rate, transistor 59 has turned off by the time the second break transient turns transistor 35 on. As transistor 59 is off, transistor 67 is at this time conducting and transistor 75 is off. Thus when the second break transient is applied, although transistor 35 is turned on, transistor 75 is off and transistor 96 is held from transistor 75 to prevent transistor 96 from turning off.

Transistor 75 is held on for the additional 5 microseconds for the following reason. With too rapid a rate, the second break causes transistor 35 to turn on and transistor 75 to turn off. Transistor 96 has been held by nonconducting transistor 35 and were transistor 75 to turn off simultaneously with the turning on of transistor 35, transistor 96 would still be held on, now by transistor 75 instead of transistor 35. By delaying the turning off of transistor 75 by 5 microseconds however, once transistor 35 is turned on, neither of transistors 35 nor 75 holds transistor 96 on, and the circuit resets.

It should be noted that although the component circuit operations have thus far been described with respect to the first two pulses only, in normal operation because all of the transistors are in the same conducting state 20 milliseconds after the second break is applied as they are 20 milliseconds after the first break, a new cycle of operation ensues which operates on the second and third dial pulses as if they were the first and second. Similar remarks apply to all succeeding sequences. The circuit continues to operate from any three successive break, make and break transients to determine whether or not the maximum permissible pulse rate is exceeded. In the illustrative embodiment, this maximum rate is $\frac{1}{80}$ millisecond or 12.5 pulses per second.

*(8) Slow pulse rate and end-of-digit circuit—Transistors 84 and 88*

Circuitry is also provided to detect too slow a pulse rate. The same equipment serves not only to detect this condition but in addition to operate the dictation machine control equipment at the end of a dialed digit. Each break transient causes transistor 40 to be turned off and a negative potential to be applied to the count lead 80 which advances the four binary counters. This same negative potential is extended through diode 81 and resistor 83 to the base of transistor 84 which is normally off. This transistor is normally nonconducting for the same reason that transistor 75 is normally nonconducting. Were the transistor to conduct, capacitor 120 would charge positively and reverse bias the emitter-base junction. The negative potential on count lead 80, however, forward biases the emitter-base junction of transistor 84 which turns on.

Transistor 88 is normally on, the emitter-base junction being forward biased with current flowing from ground through the junction, and resistors 87 and 85 to negative source 86. When transistor 84 turns on, its collector becomes more positive in potential and the emitter-base junction of transistor 88 is reverse biased. Transistor 88 turns off and the end-of-digit lead 91 becomes more negative in potential, this lead now being connected through resistor 89 to negative source 90 rather than through transistor 88 to ground.

Sixty milliseconds after transistor 40 first turns off it is turned on once again by the first make transient and a positive potenital now appears on count lead 80. Diode 81 is now reverse biased but transistor 84 continues to conduct due to the negative charge stored on capacitor 120. The capacitor discharges through the path comprising the capacitor, resistor 83 and the emitter-base junction of transistor 84. This discharge requires 60 milliseconds. If pulses are still being received at a correct rate, transistor 40 should be turned off once again 40 milliseconds later with a negative potential again being applied directly through diode 81 and resistor 83 to the base of transistor 84. Thus transistor 84 will not turn off if the second break occurs within 60 milliseconds after the first make. It is only after 60 milliseconds have elapsed after a make during which no break has been received, that transistor 84 turns off and transistor 88 turns on. At this time, a more positive potential is applied to the end-of-digit lead 91. Conductor 91 is connected to one input of each of the AND gates 112–115 and a positive pulse on conductor 91 enables the respective inputs of these AND gates. The other inputs of the AND gates are connected to flip flops 100–103 in a manner to be described below which control their respective operations at this time if the numbers 7, 8, 9 or 10 are stored in the binary counters.

(*9*) *Reset circuit—Transistor 108*

Transistor 108 is normally nonconducting for the same reason that transistors 75 and 84 are normally off. Were current to flow through the emitter-base junction of the transistor, capacitor 110 would charge positively to reverse bias the junction. The negative potential on conductor 91, which appears due to the application of the first break transient, forward biases the emitter-base junction of transistor 108, the negative potential being extended through diode 111 and resistor 109 to the base of the transistor. Transistor 108 conducts and the collector becomes more positive in potential. However, this positive potential is not transmitted through diode 105 which is reverse biased.

The positive end-of-digit pulse on conductor 91 must reset the entire circuit, in addition to controlling readout. Although a negative potential is no longer connected to the cathode of diode 111, transistor 108 continues to conduct due to the negative charge stored on capacitor 110. The transistor conducts until the capacitor discharges through resistor 109 and the emitter-base junction. This discharge requires approximately 5 milliseconds. After this period, transistor 108 turns off, its collector becomes negative in potential, and a negative pulse is transmitted through diode 105 to the reset terminal of each of flip-flops 100–103 and along conductor 121 to the base of transistor 40. This transistor turns on and the circuit is reset. The purpose of delaying the turning off of transistor 108 for 5 milliseconds after transistor 88 turns on is to permit AND gates 112–115 to operate prior to the resetting of the counter stages.

Although the positive pulse on end-of-digit conductor 91 is an indication that a complete digit has been dialed, this pulse also resets the circuit if pulses are received at too slow a rate. If before 7, 8, 9 or 10 break and make pairs have been counted, a break transient does not follow a make transient within 60 milliseconds, transistor 84 turns on and transistor 88 turns off as they do at the end of a digit. At this time, one input of each of AND gates 112–115 is energized but as a 7, 8, 9 or 10 is not stored within binary stages 100–103, the other four inputs of each of these gates are not all energized and no output pulse is obtained on control conductors 116–119. After 5 milliseconds the circuit resets as transistor 108 turns off. By requiring the higher numbered digits on the rotary dial to be employed for control purposes the same circuitry can control the end-of-digit operation as well as the resetting of the entire circuit if pulses are received at two slow a rate.

It is thus seen that the circuit checks not only that a make and a second break do not both occur within 80 milliseconds after a first break, but in addition, that all breaks follow makes within at least 60 milliseconds during the pulsing sequence.

(*10*) *Counters 100–103*

FIG. 4 illustrates the states of binary counters 100–103 when they are reset as well as after the digits 1–10 have been dialed. When reset, all of the stages are in the "0" state. Each stage is advanced when the preceding stage changes from the "0" to the "1" state. The first negative potential on count conductor 80 advances stage A, flip-flop 100, which changes from the "0" to the "1" state. As a consequence, stage B likewise changes state. Because stage B changes from the "0" to the "1" stage, stage C also changes state. Similar remarks apply to stage D. The second negative pulse on count lead 80 changes the state of stage A from "1" to "0." Stages B–D do not change state as the stages preceding each of them do not change from the "0" to the "1" state. The third pulse causes stage A to change from the "0" to the "1" state which in turn causes stage B to change state also. Stage C, however, does not switch as stage B has switched from the "1" to the "0" state rather than from the "0" to the "1" state. Similar remarks apply to the operation of the four counter stages for the remaining incoming digits shown in FIG. 4.

(*11*) *Read-out circuit—AND gates 112–115*

Only one of the two ouputs of each counter stage is energized at any one time. If the stage is in the "1" state the "1" output is energized. If the stage is in the "0" state the "0" output is energized. The counter outputs are connected to the inputs of the various AND gates 112–115. Only if the four inputs of any AND gate connected to the counter outputs are energized when the positive end-of-digit signal appears on conductor 91 is the AND gate operated. For example, if the digit "8" has been dialed and is stored within the counter stages, as seen from FIG. 4, stages A, B and C are in the "0" state and stage D is in the "1" state. Thus the "0" outputs of stages A, B and C are energized as is the "1" output of stage D. It is seen that four inputs of AND gate 113 connected to the counter stage outputs are all energized when the end-of-digit signal appears on conductor 91 thus causing control conductor 117 to be energized. Similar remarks apply to conductors 116, 118 and 119. For illustrative purposes these conductors have been shown as controlling the correction, end-of-message, playback and attendant control circuits of dictation machine 14. The number of AND gates utilized and the interpretation of the control signals on the control conductors depends upon the particular machine analogous to dictation machine 14 used in any application.

It should be noted that transistor 108, being normally off, causes the negative potential of source 107 to be applied through resistor 106 and diode 105 to the reset terminals of the four counter stages as well as to the base of transistor 40. The circuit is thus normally held in the reset condition until the first break transient is received. The first positive pulse transmitted through capacitor 27 is applied to the base of transistor 40 which turns this transistor off. This transistor would normally turn on immediately thereafter however due to the fact that the base of transistor 40 is still connected through the reset lead 121, diode 105, and resistor 106 to negative source 107. For this reason, capacitor 39 is made large in magnitude. This capacitor maintains transistor 40 off until after the negative step on count lead 80 causes transistor 84 to turn on, transistor 88 to turn off, and transistor 108 to turn on. At this time, the negative potential is removed from reset lead 121 and transistor 40 operated responsive to further pulses transmitted through capacitor 27.

*The frequency occurring noise—Its origin and effective elimination*

Although the major transient of each make and break signal has a maximum duration of 10 milliseconds, the period of unstable state operation of transistors 25 and 26 is made equal to 20 milliseconds. The purpose of including this monostable multivibrator in the circuit is to insure that each transient operates the bistable circuit comprising transistors 35 and 40 only once. The first positive signal in any transient causes the monostable multivibrator to assume its unstable state and remain operated until after the transient has completely decayed, the peaks occurring during the latter portion of the transient having no effect on the circuit. Although the major transient decays in only 10 milliseconds the unstable state operation ensues for 20 milliseconds. This is to mitigate against the effects of a certain particular type of noise which occurs rather often.

The dial pulses transmitted through the telephone exchange network may pass through various repeater stages, amplifying circuits, etc. These circuits very often delay the D.C. pulses. In amplifying the D.C. pulses, A.C. transients are produced which are not delayed to the same extent. Thus these oscillatory transients are received by the detector circuit prior to the major transient which occurs due to the transmission of the make or break after the last repeater or amplifier stage. Thus shortly before the major transient which results from the transmission of the make or break after the last amplifier stage, a short oscillatory wave form is received as is shown in FIG. 3B. The first positive signal in this waveform triggers the monostable multivibrator comprising transistors 25 and 26. These transistors would time out after 10 milliseconds, were this the duration of the unstable operation, at which time the last portion of the major transient is still being received. This would cause the multivibrator to reoperate, falsely indicating that the pulses are occurring at too rapid a rate. For this reason, the unstable state of the multivibrator has a duration of 20 milliseconds to insure that the major transient has completely decayed by the time the multivibrator reverts to its stable state. Although the "noise" preceding the major transient may trigger the multivibrator, the detector circuit treats this noise as the make or break transient itself and ignores the major transient which occurs while the multivibrator is in its unstable state. In this manner the noise, which might normally be considered an erroneous signal, is treated as the valid make or break signal, and the major transient itself is ignored if it was preceded by the noise signal produced when the make or break step was repeated in the telephone exchange network.

*Sequential operation—Normal, fast, and slow pulse rates*

The operation of the circuit may be summarized by considering its sequential operation for each of the three possible pulse rates.

(1) Assume that the subscriber has dialed the digit 9 to control the play-back of dictation machine 14. The first break transient switches the state of the flip-flop comprising transistors 35 and 40. The counter comprising stages 100–103 is advanced by one count when the count conductor 80 is increased in negative potential. The end-of-digit conductor 91 similarly is increased in negative potential and transistor 108 conducts. Diode 105 is reverse biased however and the conduction of transistor 108 has no effect on the circuit. This first break transient causes the 80 millisecond monostable multivibrator to enter its unstable state. Transistor 67 still conducts however as transistor 40 is now off.

Sixty milliseconds later the first make appears and resets the flip-flop. At this time transistor 40 turns on and transistor 67 turns off. Transistor 75 now conducts. Transistor 96 remains conducting however as transistor 35 is now off. Twenty milliseconds after the first make the 80 millisecond monostable multivibrator reverts to its stable state. Transistor 67 now turns on. Five microseconds later transistor 75 turns off and both inputs of transistor 96 are enabled. Transistor 96 thus continues to conduct.

After the first make capacitor 120 begins to discharge and hold transistor 84 conducting. Conductor 91 is thus still negative in potential. Although this conductor would normally increase in potential after 60 milliseconds, the second break arrives after 40 milliseconds and hold transistor 84 on once again. This second break, as did the first, switches the state of the flip-flop, advances the count of counter stages 100–103 and triggers the 80 millisecond monostable multivibrator. The second make and third break control the circuit operation in a manner similar to the first make and second break. Similar remarks apply to the other pulses received. After nine pulses have been counted the flip-flop is in its reset state and capacitor 120 discharges. A tenth break is not received within the next 60 milliseconds and thus after 60 milliseconds, when capacitor 120 has discharged fully, transistor 88 turns on and conductor 91 is increased in potential. This increased potential immediately causes the pulse to appear on conductor 118 as all five inputs of AND gate 114 are now energized. The dictation machine responds to this playback command. Diode 111 is now reverse biased and after five microseconds when capacitor 110 has discharged transistor 108 turns off. A negative potential is now applied through diode 105 to reset the entire circuit in anticipation of further dialed digits.

(2) Assume that a spurious signal is being received resulting in too fast a "pulse" rate. For example, suppose four signals are received at the normal rate but the fourth is followed by another signal within 10 milliseconds. This indicates too rapid a pulse rate as the fourth signal, interpreted as a make pulse, and the subsequent incoming signal treated as a break pulse, both occur within 80 milliseconds after the third signal, interpreted as the second break, occurs. The third signal received, interpreted as the break of the second pulse causes the flip-flop to be set and the 80 millisecond monostable multivibrator to be triggered. The fourth signal occurring after 60 milliseconds causes transistor 67 to be turned off and transistor 75 to be turned on. The fifth signal switches the state of the flip-flop and transistor 67 now conducts. Transistor 75 does not immediately turn off however due to the charge stored on capacitor 71. Transistor 75 remains conducting for five microseconds. As transistor 35 is now on positive potentials are applied to both resistors 93 and 92 and transistor 96 now turns off. The negative potential applied to the reset conductor 121 causes the entire circuit to reset. Although the counter stages have counted two pulses, these pulses are not valid pulses, having arisen from spurious signals. The circuit is reset before 7, 8, 9 or 10 pairs of these spurious signals are counted and erroneously operate one of the dictation machine controls. The entire circuit is reset and can now receive valid pulses if they are dialed by the subscriber.

(3) Assume that the subscriber erroneously dialed the digit 2, or alternatively 4 spurious signals occurring at a normal dial pulse rate have been received. The circuit functions in a manner identical to that described in the section immediately above. After the fourth signal is received the flip-flop is reset and capacitor 120 begins to discharge. The sequence is identical to that described for the normal pulse rate sequence. The end-of-digit conductor 91 increases in potential 60 milliseconds after the fourth signal causes the flip-flop to be reset. The reset transistor 108 turns off and a negative potential is applied to conductor 121 to reset the entire circuit. Although the increased potential at conductor 91 is also applied to one input of each of AND gates 112–115, as none of the digits 7–10 are now stored in the counter stages none of these AND gates has all of its five inputs energized at this time. Consequently although the circuit is reset no read-out pulse is obtained on one of conductors 116–119.

Although the invention has been described with a certain degree of particularlity it is to be understood that the above-described arrangement is illustrative of the application of the principles of the invention. Numerous other arrangements may be devised by those skilled in the art without departing from the spirit and scope of the invention.

What is claimed is:

1. A dial pulse detector for analyzing dial pulses transmitted over a telephone network where each dial pulse has oscillatory break and make transients comprising means operative in response to all incoming transient and noise signals and insensitive to all signals occurring during a first predetermined time interval after the initiation of its operation; means for counting alternate operations of said signal responsive means; first means for detecting whether said signals are being received at a rate greater than a first predetermined rate, said first detecting means including first gating means responsive to an operation of said signal responsive means, and second gating means responsive to the operation of said first gating means and two successive operations of said signal responsive means within a second predetermined time interval; second means for detecting whether said signals are being received at a rate less than a second predetermined rate, said second detecting means including means responsive to the absence of a break transient following a make transient for a third predetermined time interval; and means for resetting said counting means responsive to the operation of either said first or second detecting means.

2. A dial pulse detector for analyzing dial pulses transmitted over a telephone network where each dial pulse has break and make transients comprising means operative in response to incoming transients and noise signals; first means for detecting whether said incoming signals are being received at a rate greater than a first predetermined rate, said first detecting means including first gating means responsive to an initial operation of said signal responsive means, and second gating means responsive to the operation of said first gating means and two successive operations of said signal responsive means within a first predetermined time interval after said initial operation; and second means for detecting whether said incoming signals are being received at a rate less than a second predetermined rate, said second detecting means including means responsive to the absence of a break transient following a make transient for a second predetermined time interval.

3. A pulse detector for analyzing a series of pulses where each of said pulses comprises a break followed by a make transient comprising first means for counting said pulses, second means for counting the number of transients occurring within a first predetermined time interval and operative when said pulses are being received at a rate greater than a first predetermined rate, means for timing the interval between successive pulses and operative responsive to the absence of a pulse for a second predetermined time interval to detect whether said pulses are being received at a rate less than a second predetermined rate, means for resetting said first counting means responsive to the operation of said second counting means and said timing means, and read-out means controlled by said first counting means and operative in response to the operation of said timing means prior to the operation of said resetting means when the count stored in said first counting means is any one of a plurality of predetermined digits.

4. A pulse detector for analyzing a series of pulses where each of said pulses comprises a first transient followed by a second transient comprising means for counting the number of successive transients occurring within a first predetermined time interval to detect if said pulses are being received at a rate greater than a first predetermined rate, said counting means including means for counting three successive transients within said first predetermined time interval to detect if said pulses are being received at a rate greater than said first predetermined rate, and means for timing the interval between successive pulses and operative responsive to the absence of a pulse for a second predetermined time interval to detect if said pulses are being received at a rate less than a second predetermined rate.

5. A dial pulse detector for analyzing dial pulses transmitted over a telephone network where each dial pulse has oscillatory break and make transients comprising first means operative in response to all incoming transient and noise signals and insensitive to all signals occurring during a first predetermined time interval after its operation, a one stage binary counter responsive to said first means after said first predetermined time interval has elapsed, second means responsive to said binary counter being triggered to a first stable state and operative for a second predetermined time interval, third means operative in response to the simultaneous operation of said second means and said binary counter when said binary counter is in a second stable state, said third means remaining operative during said simultaneous operation and for a third predetermined time interval after said simultaneous operation has terminated, gating means responsive to said binary counter being placed in said first stable state prior to the termination of operation of said third means, counting means for counting the number of times said one stage binary counter is placed in said first stable state, and means for resetting said one stage binary counter to said second state and said counting means responsive to the operation of said gating means.

6. A dial pulse detector in accordance with claim 5 further including timing means operative when said one stage binary counter is in said first stable state, means for maintaining said timing means operated for a fourth predetermined time interval after said one stage binary counter is placed in said second stable state, and means responsive to the termination of operation of said timing means for operating said resetting means.

7. A dial pulse detector in accordance with claim 6 further including read-out means responsive to the termination of operation of said timing means and operative prior to the operation of said resetting means for indicating the count stored in said counting means if said count is one of a plurality of predetermined numbers.

8. A control circuit for controlling the operation of a subscriber device connected to a telephone line where said device is controlled by the transmission of one of a predetermined series of pulses along said line comprising means connected to said line for counting any series of pulses transmitted along said line, first means controlled by said pulses and operative responsive to said pulses being received at a rate greater than a first predetermined rate, second means controlled by said pulses and operative responsive to said pulses being received at a rate less than a second predetermined rate, resetting means responsive to said first means or said second means for resetting said counting means, and means connecting said counting means to said subscriber device for controlling said device in accordance with the count stored in said counting means prior to the resetting of said counting means and responsive to the operation of said second means when the count stored in said counting means represents any one of a plurality of predetermined numbers.

9. A dial pulse detector for counting a series of dial pulses transmitted along a telephone line where each of said pulses has break and make transients and for operating a subscriber device connected to said line comprising input means operative only once responsive to each break or make transient or noise signal, a single-stage binary counter responsive to each operation of said input means, counting means responsive to alternate operations of said single-stage binary counter, timing means operative for a first predetermined time interval responsive to a first operation of said single-stage binary counter, first gating means responsive to the simultaneous operation of said timing means and a second operation of said single-stage binary counter, second gating means responsive to the operation of said first gating means for operating during the operation of said first gating means and for a second predetermined time interval thereafter, third gating means responsive to the simultaneous operation of said second gating means and a third operation of said single-stage binary counter, means for controlling the operation of said subscriber device in accordance with the final count stored in said counting means, and means for inhibiting the operation of said subscriber device responsive to the operation of said third gating means.

10. A dial pulse detector for counting a series of dial pulses transmitted along a telephone line where each of said pulses has break and make transients and for operating a subscriber device connected to said line comprising input means operative only once responsive to each break or make transient or noise signal, a single-stage binary counter responsive to each operation of said input means, counting means responsive to alternate operations of said single-stage binary counter, first timing means operative for a first predetermined time interval responsive to a first operation of said single-stage binary counter, first gating means responsive to the simultaneous operation of said first timing means and a second operation of said single-stage binary counter, second gating means responsive to the operation of said first gating means for operating during the operation of said first gating means and for a second predetermined time interval thereafter, third gating means responsive to the simultaneous operation of said second gating means and a third operation of said single-stage binary counter, second timing means responsive to alternate operations of said single-stage binary counter for detecting the absence of a third operation of said single-stage binary counter after a second operation of said single-stage binary counter within a third predetermined time interval, means for operating said subscriber device in accordance with the count stored in said counting means responsive to the detection by said second timing means of the absence of said third operation of said single-stage binary counter, and means for inhibiting the operation of said subscriber device responsive to either the operation of said third gating means or the count stored within said counting means being different than all numbers in a predetermined group of numbers at the time of operation of said second timing means.

References Cited by the Examiner

UNITED STATES PATENTS

| | | | |
|---|---|---|---|
| 2,553,594 | 5/1951 | Lichtman et al. | 340—168 |
| 2,589,465 | 3/1952 | Weiner | 340—253 |
| 2,597,428 | 5/1952 | Bachelet | 340—253 |
| 2,837,642 | 6/1958 | Schenck | 340—164 |
| 2,984,789 | 5/1961 | O'Brien | 328—120 |
| 2,986,699 | 5/1961 | McHenry | 328—41 |

ROBERT H. ROSE, *Primary Examiner.*

WALTER L. LYNDE, *Examiner.*